(12) United States Patent
Uysal et al.

(10) Patent No.: US 6,922,752 B2
(45) Date of Patent: Jul. 26, 2005

(54) STORAGE SYSTEM USING FAST STORAGE DEVICES FOR STORING REDUNDANT DATA

(75) Inventors: Mustafa Uysal, Davis, CA (US); Arif Merchant, Los Altos, CA (US); Guillermo Alvarez, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 10/226,111

(22) Filed: Aug. 23, 2002

(65) Prior Publication Data

US 2004/0037120 A1 Feb. 26, 2004

(51) Int. Cl.[7] .................................................. G06F 12/00
(52) U.S. Cl. ........................ 711/114; 711/100; 711/112; 711/113; 711/161; 711/162; 714/5; 714/6
(58) Field of Search ................................. 711/114, 100, 711/111, 112–113, 161–162; 714/5–6

(56) References Cited

U.S. PATENT DOCUMENTS

| | | | | |
|---|---|---|---|---|
| 5,548,711 A | * | 8/1996 | Brant et al. ..................... 714/5 |
| 5,617,530 A | * | 4/1997 | Stallmo et al. ................. 714/6 |
| 5,619,723 A | * | 4/1997 | Jones et al. .................... 710/3 |
| 5,659,704 A | * | 8/1997 | Burkes et al. ............... 711/114 |
| 5,701,406 A | | 12/1997 | Matsumoto et al. |
| 5,708,668 A | * | 1/1998 | Styczinski ..................... 714/6 |
| 5,787,460 A | * | 7/1998 | Yashiro et al. ............... 711/114 |
| 5,911,779 A | * | 6/1999 | Stallmo et al. ................. 714/6 |
| 6,012,123 A | * | 1/2000 | Pecone et al. .............. 711/114 |
| 6,223,251 B1 | * | 4/2001 | Nemoto ...................... 711/114 |
| 6,473,830 B2 | * | 10/2002 | Li et al. ...................... 711/112 |
| 6,658,542 B2 | * | 12/2003 | Beardsley et al. ........... 711/162 |
| 6,742,019 B1 | * | 5/2004 | Dan et al. .................... 709/213 |
| 6,772,302 B1 | * | 8/2004 | Thompson .................. 711/162 |
| 2001/0049776 A1 | * | 12/2001 | Maeda ........................ 711/162 |
| 2003/0018851 A1 | * | 1/2003 | Ikeuchi et al. .............. 711/114 |

OTHER PUBLICATIONS

Anujan Varma and Quinn Jacobsen; "Destage Algorithms for Disk Arrays with Non–Volatile Caches"; Computer Engineering Department at University of California, Santa Cruz, CA 95064, May–1995, pp. 83–95.*

Eric J. Schwabe and Ian M. Sutherland; "Flexiable Usage of Parity Storage Space in Disk Arrays"; Department of EECSA, Northwestern University, Evanston, IL 60208, Jun.–1996, pp99–108.*

Hu, Yiming and Yang, Qing; "DCD—Disk Caching Disk: A New Approach for Boosting I/O Performance;" Dept. of Electrical & Computer Engineering, University of Rhode Island, Kingston, RI 02881, May 1996, pp. 169–178.

Menon, Jai and Mattson, Dick; "Distributed Sparing in Disk Arrays;" IBM Almaden Research Center, San Jose, California 95120–6099, 1992, pp. 410–421.

(Continued)

*Primary Examiner*—Matthew D. Anderson
*Assistant Examiner*—Zhuo H. Li (57) ABSTRACT

A computer storage system includes a controller and a storage device array. The storage device array may include a first sub-array and a fast storage device sub-array. The first sub-array includes one or more first storage devices storing data. The fast storage device sub-array includes one or more fast storage devices storing a copy of the data stored in the first sub-array.

28 Claims, 6 Drawing Sheets

OTHER PUBLICATIONS

Merchant, Arif and Yu, Phillip S.; "Analytic Modeling and Comparisons of Striping Strategies for Replicated Disk Arrays;" IEEE Transactions on Computers, vol. 44, No. 3, Mar. 1995, pp. 419–433.

Chiueh, Tzi–cker and Huang, Lan; "Trail: A Fast Synchronous Write Disk Subsystem Using Track–Based Logging;" Computer Science Department, State University of New York at Stony Brook; Stony Brook, NY 11794–4400, pp. 1–22.

Hu, Yiming; Yang, Qing and Nightingale, Tycho; "Rapid-Cache—A Reliable and Inexpensive Write Cache for Disk I/O Systems;" Department of Electrical & Computer Engineering, University of Rhode Island, Kingston, RI 02881, Jan. 1999, pp. 1–10.

Solworth, Jon A. and Orji, Cyril U.; "Distorted Mirrors;" University of Illinois at Chicago, Box 4348, Chicago, Illinois 60680, Apr. 1991, pp. 10–17.

* cited by examiner

FIG. 1

DISK SUB-ARRAY 202

| B1 | B2 | B3 | S1 |
|----|----|----|----|
| B4 | B5 | S2 | B6 |
| B7 | S3 | B8 | B9 |
| S4 | B10 | B11 | B12 |
| B13 | B14 | B15 | S5 |
| - - - | - - - | - - - | - - - |
| | | | |
| | | | |

STORAGE SYSTEM USING FAST STORAGE DEVICES FOR STORING REDUNDANT DATA

FIELD OF THE INVENTION

The invention pertains to computer storage systems. More particularly, this invention relates to a computer storage system utilizing fast storage devices.

BACKGROUND OF THE INVENTION

Disk arrays are used to provide storage for computer applications that need increased reliability in the face of component failures, as well as high performance for normal use. The disks in the disk arrays are often arranged as a redundant array of independent disks (RAID). The RAID arrays provide larger capacity, higher performance and, typically, higher availability for stored data than using disks individually. This is done by distributing the data across multiple disks and with back-up information. The back-up information may be a copy of the data or enough parity information to regenerate the data if a disk or related component fails. Storing a copy of the data usually provides higher performance for read operations, however, write operations can be slower, because both copies of the data must be updated in the RAID.

One problem with RAID arrays is that the disks are relatively inefficient in accessing small amounts of data that are not sequentially stored on a disk. In a typical 4 KB read, a conventional disk might require between 5 and 20 ms to position the disk head before beginning to transfer data, and less than 0.5 ms transferring the data. When copies of the data are stored in a disk array, small writes are typically even more inefficient. The original data and a copy must be written. Accordingly, disk heads corresponding to disks storing the original data and the copy spend time positioning themselves before writing the small amount of data.

Another problem with RAID disk arrays is that when a disk fails, the resulting extra load is not spread uniformly over the remaining disks, and the length of time for rebuilding the data onto a replacement disk is long.

There are several proposed techniques for ameliorating these problems, but each has its own disadvantages. In one technique, two copies of the data, each using different stripe sizes, are maintained. Both copies are on a disk, and the disk has both a "large-striped" copy and a "small-striped copy." Having one copy that is large-striped improves performance for large, sequential input/output (I/O) accesses. However, there is no provision for spare space to accommodate disk failures, and this technique generally does not improve rebuild time after a disk fails.

A second technique incorporates distributed sparing. A spare space is distributed over a pair of disk arrays. If a disk fails, the data in that disk is reconstructed and temporarily stored in the spare space on the other array. When the failed disk is replaced, the data is then copied back to this disk. Because the data to be copied is distributed over the disk array, a significant amount of a disk head movement is typically needed to perform the copy-back operation, which results in poor performance.

SUMMARY OF THE INVENTION

According to an embodiment of the invention, a computer storage system includes a controller configured to perform data operations and a storage device array having a first sub-array and a fast storage device sub-array. The first sub-array stores data and the fast storage device sub-array stores a copy of the data stored in the first sub-array.

According to another embodiment of the invention, a method of performing data operations on a storage system includes receiving a request to perform a data operation; determining whether the request provokes a write operation on the storage system; and writing data to at least one first storage device using stripe units and writing a copy of the data to at least one fast storage device using smaller stripe units in response to the request provoking a write operation.

According to yet another embodiment of the invention, a method for recovering from the failure of one of a plurality of first storage devices includes reading stripe units from a plurality of fast storage devices in response to a first storage device failing. The stripe units include data redundant to the data stored on the failed first storage device. The method also includes writing the redundant data to unused stripe units in the first storage devices that remain operative.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well-known structures, interfaces, and processes have not been shown in detail in order not to unnecessarily obscure the present invention.

Figure 1:
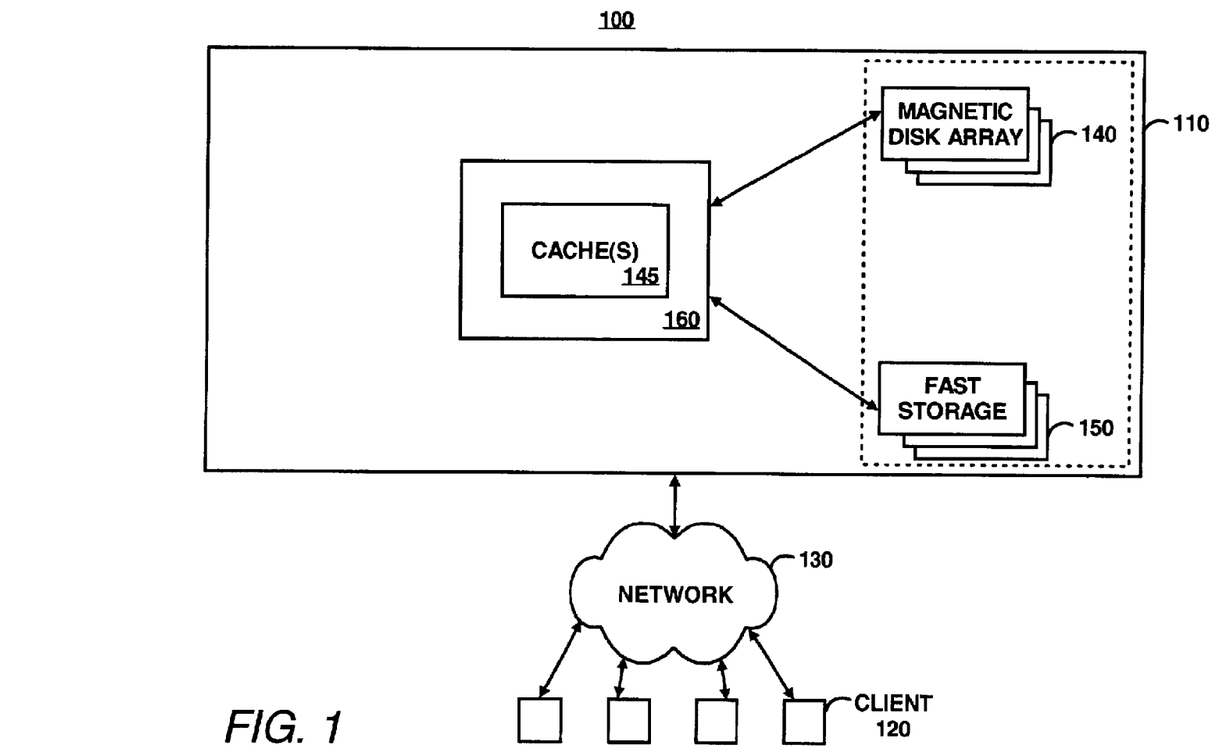
FIG. 1 illustrates a computer system, according to an embodiment of the invention.

FIG. 1 illustrates a computer system 100, according to an embodiment of the invention. The computer system 100 includes a storage device 110 connected to at least one client 120 (e.g., a server) via a network 130. The storage device 110 includes multiple magnetic disks 140 (which may include an array) and multiple fast storage devices 150 connected to a controller 160, which manages data operations for the disks 140 and the fast storage devices 150.

The storage device 110 may optionally include one or more caches 145 for caching data for the disks 140 and the fast storage devices 150. FIG. 1 illustrates multiple caches 145 connected to the disks 140, the fast storage devices 150, and the controller 160.

The fast storage devices 150 may include one or more of several kinds of storage devices which have a smaller overhead than conventional magnetic disks before starting data transfers. The fast storage devices 150 may have data transfer rates similar to and/or better than conventional magnetic disks, but shorter positioning times. One example of a fast storage device is a micro-electro-mechanical system (MEMS) storage device.

It will be apparent to one of ordinary skill in the art that the controller 160 may be a component separate from the disks 140 and the fast storage devices 150. Furthermore, the controller 160 may be implemented with software components, instead of hardware components, or both software and hardware components. Also, the computer system 100 is not limited to using the network 130, and one or more clients 120 may be directly connected to the storage device 110.

Also, it will be apparent to one of ordinary skill in the art that the storage device 110 may include any type of persistent storage devices. The storage device 110 is not limited to the magnetic hard disks 140 and may alternatively include another type of storage media (e.g., optical disks, tapes, etc.). In addition, the fast storage devices 150 are not limited to MEMS and may include other fast storage devices, such as flash RAM, magneto-resistive RAM (MRAM), battery-backed DRAM or SRAM, etc. Also, the disks 140 and fast storage devices 150 may not be in one box or even in one location. Furthermore, the disks 140, the fast storage devices 150, and the controller 160 may be connected via one or more networks.

Redundant data may be stored in the fast storage devices 150, which enables failure recovery and may improve performance. In one embodiment, the disks 140 and the fast storage devices 150 are configured as one or more RAIDs. The disks 140 may store one copy of data (e.g., the original data) and the fast storage devices 150 may store redundant data (e.g., a copy of the original data, such as mirror data for RAID 1 or RAID 1/0). The disks 140 and the fast storage devices 150 may be configured according to one of a variety of RAID layouts, such as described in U.S. patent application (TBD), entitled "A Storage System Including A Fast Storage Device For storing Redundant Data" and herein incorporated by reference.

Since access times are shorter for the fast storage devices 150, write operations on the storage device 110 are typically performed much more efficiently for all RAID levels (e.g., it is only necessary to wait for a single disk access instead of two accesses, as would be required if both copies of the data were on disk). Therefore, overall performance for the storage device 110 is improved. Furthermore, a balance between performance and hardware cost may be achieved by combining the fast storage devices 150 with slower, less expensive storage media (e.g., the disks 140) within the same logical unit (LU), which acts as a single virtual storage device (e.g., one or more mirrored pairs).

As described above, two copies of data (e.g., the original data and the redundant data) may be stored on the disks 140 and the fast storage devices 150. Both copies of the data may be striped, but the copy on the fast storage device(s) 150 may have a smaller stripe size than the copy stored on the disk(s) 140. Also, a sufficient amount of unused space may be maintained on the disks 140 and the fast storage devices 150 to accommodate data from a failed device (e.g., one of the disks 140 or one of the fast storage devices 150).

Figure 2A:
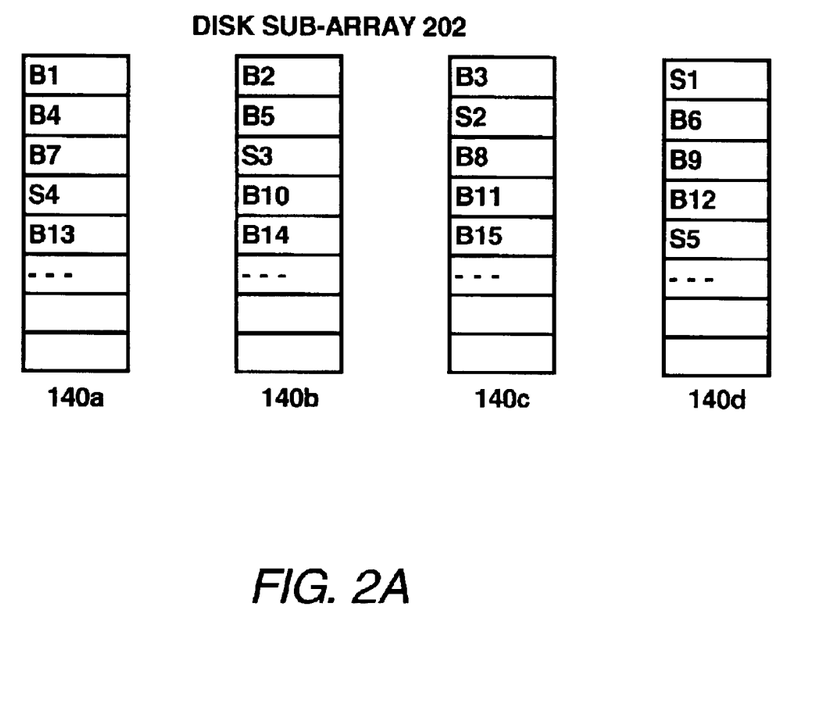
FIG. 2A illustrates a disk sub-array, according to an embodiment of the invention, which may be used in the computer storage device shown in FIG. 1.
Figure 2B:
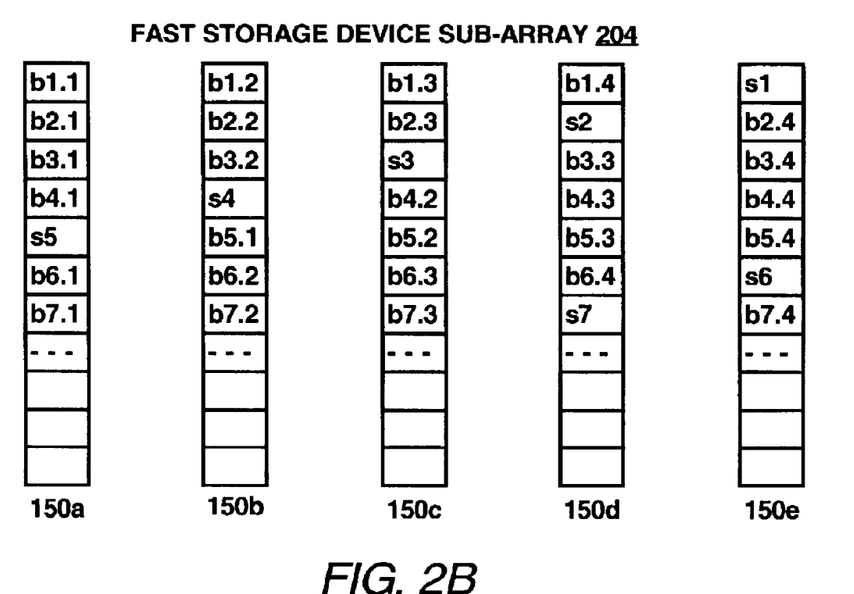
FIG. 2B illustrates a fast storage device sub-array, according to an embodiment of the invention, which may be used in the computer storage device shown in FIG. 1.

FIGS. 2A–B illustrate an embodiment of the storage device 110 including an array having a sub-array 202 using the disks 140 (e.g., disks 140a . . . d shown in FIG. 2A) and having a sub-array 204 using the fast storage devices 150 (e.g., fast storage devices 150a . . . e shown in FIG. 2B). Generally, the data stored in the array is replicated. One copy resides in the disk sub-array 202, and the other in the fast storage device sub-array 204. A sub-array may include an array which may operate with one or more other arrays to function as a single array.

Stripe units are fixed-size blocks, and a collection of related stripe units is called a stripe. The data in the disk sub-array 202 is distributed (striped) across the disks 140a . . . d using, for example, a RAID 0 layout with large stripe unit sizes (e.g., 1 MB).

Stripe units B1–B15 are distributed across the disks 140a . . . d. One stripe unit in each stripe (e.g., stripe units S1 . . . S5) is kept unused (spare), similar to the location of parity blocks in a RAID 5 layout. For example, using the left-symmetric layout shown in FIG. 2B, which is also commonly used for placing parity blocks in a RAID5 layout, the first spare stripe unit S1 may be placed on any disk and each successive spare stripe unit placed on the disk to the left of the previous spare stripe unit (e.g., S2 on disk 140c, S3 on disk 140b, etc.), rotating over to the rightmost disk when the previous spare stripe unit lies on the leftmost disk (e.g., S5). The data stripe units are placed on disks left to right, skipping the disk which holds the spare stripe unit for that stripe.

The data stored in the disk sub-array 202 is replicated in the fast storage device sub-array 204, and the data in the fast storage device sub-array 204 may also be distributed according to a RAID 0 layout. However, smaller stripe units are used for storing the data in the fast storage device sub-array 204. For example, the data stored in the stripe unit B1 in the disk sub-array 202 is also stored in the stripe units b1.1, b1.2, b1.3, and b1.4, which are distributed across the fast storage devices 150b . . . e in the fast storage device sub-array 204. As illustrated in FIG. 2B, smaller stripe units in the fast storage device sub-array 204 may also be used for storing the data in the remaining stripe units (e.g., B1–B15, etc.) in the disk sub-array 202.

The size of a stripe including the smaller stripe units in the fast storage devices 150 may be approximately equal to a stripe unit in the disk sub-array 202. For example, if there are "m" fast storage devices in the fast storage device sub-array 204, a stripe unit in the fast storage device sub-array 204 may be approximately 1/(m−1) times the size of a stripe unit in the disk sub-array 202. Thus, a fast storage device stripe is approximately equal to a disk stripe unit.

Some of the smaller stripe units in the fast storage device sub-array 204 are also maintained as unused (spare units, such as s1 . . . s7). Therefore, if one of the fast storage devices 150 fails, the data may be stored in the smaller spare units and vice versa. As with the disk sub-array 202, one spare stripe unit in each stripe may be rotated similarly to the location of parity blocks in a RAID-5 layout.

The controller 160 may handle requests from the clients 120 and perform data operations for writing and reading data from the disks 140 and the fast storage devices 150. For example, the controller 160 may receive a write request from one of the clients 120. The controller 160 may write the data to the cache 145. If the cache 145 is redundant (i.e., two copies of the data are cached), the write is complete. If the cache 145 is not redundant, the write is complete when a write to one of the fast storage device(s) 150 or the disk(s) 140 is complete. Therefore, the data is stored in the cache 145 and a copy is stored on a storage media. The data in the cache 145 may be evicted when the data has been written to both the storage device(s) 150 and the disk(s) 140. If no cache is used, then the data is written to the disk(s) 140 and a copy is written to the fast storage device(s) 150. In this case, the write is not complete until both copies are written.

Read requests are handled by separating them into two categories. The controller 160 tags incoming read requests as "sequential" (i.e., performed on addresses consecutive to those of previous requests) or "non-sequential". Sequential and non-sequential requests are entered in separate queues. The sequential requests may be served by the disks 140, and the non-sequential requests may be served by the fast storage devices 150. However, if there are no sequential requests for a disk 140, a non-sequential request may be served by the disk. Similarly, non-sequential requests are non-existent for a fast storage device of the fast storage devices 150, the fast storage device may serve a sequential request. When reading a sequential request from a disk, additional data may be read ahead in order to make future read requests in this sequence efficient.

The controller 160 may determine whether a read request is sequential or non-sequential using heuristics. In one embodiment, the controller 160 stores the addresses of a number of recent read requests (e.g., the last 1000 read requests). When a new request is received by the controller 160, the controller 160 checks the addresses to determine whether more than t requests sequentially prior to the new request are in the list of recent read requests. If so, the new request is marked sequential, otherwise, non-sequential. The threshold t may be a predetermined default threshold or a specified threshold.

In the event of a device failure in 110, the controller 160 may reconstruct a failed disk and/or fast storage device. More specifically, if a disk of the disks 140 fails, corresponding stripe units are reconstructed in memory (not shown) by reading from the fast storage device(s) 150 and writing to the spare disk blocks in the operative disks. For example, if the disk 140a (shown in FIG. 2A) fails, the stripe units associated in the fast storage devices 150 corresponding to the stripe units B4, B7 and B13 in the failed disk 140 are read from the fast storage devices 150 and written to the spare units in the operative disks 140. As described above, each disk stripe unit may be distributed over m−1 fast storage devices 150.

If a fast storage device 150 fails, the data from that device is reconstructed by copying from the disks 140 to a memory buffer (not shown). Then, the data is copied from the memory buffer to the operative fast storage devices 150. Again, the read load may be spread over multiple disks 140 (because of the rotation of stripe units) and the write load may be spread over multiple operative fast storage devices 150.

The reconstruction operations can occur in the background, giving priority to external I/O requests. Since the data read first goes to a memory buffer, the reading and writing can proceed asynchronously. For example, the reading can proceed when the device to be written to is busy if there is space in the buffer. Similarly, writing can proceed as long as there is data for that device in the buffer.

When a failed disk is replaced, the current version of the data is copied back to the replaced disk. The data can be read from either the copy in the fast storage devices 150 or, if it has been reconstructed to the spares on the surviving disks, from there. The resulting read load can thus be spread over all the other storage devices. When a failed fast storage device is replaced, the current version of the data is copied to it, similarly to the disk case.

Once a stripe unit is copied back to the replaced device, the corresponding spare block goes back to being a spare. A (potentially fault-tolerant) bitmap or watermark pointers can be used to keep track of the progress of the reconstruction. As in the case of copying to restore redundancy, this copying can occur through a memory buffer, allowing asynchronous reading and writing in the background.

The embodiments shown in FIGS. 1 and 2A–B are provided for illustration purposes and not by way of limitation. It will be apparent to one of ordinary skill in the art that the number and configuration of disks and fast storage devices used in the storage device 110 can vary and be optimized for different applications.

Figure 3:
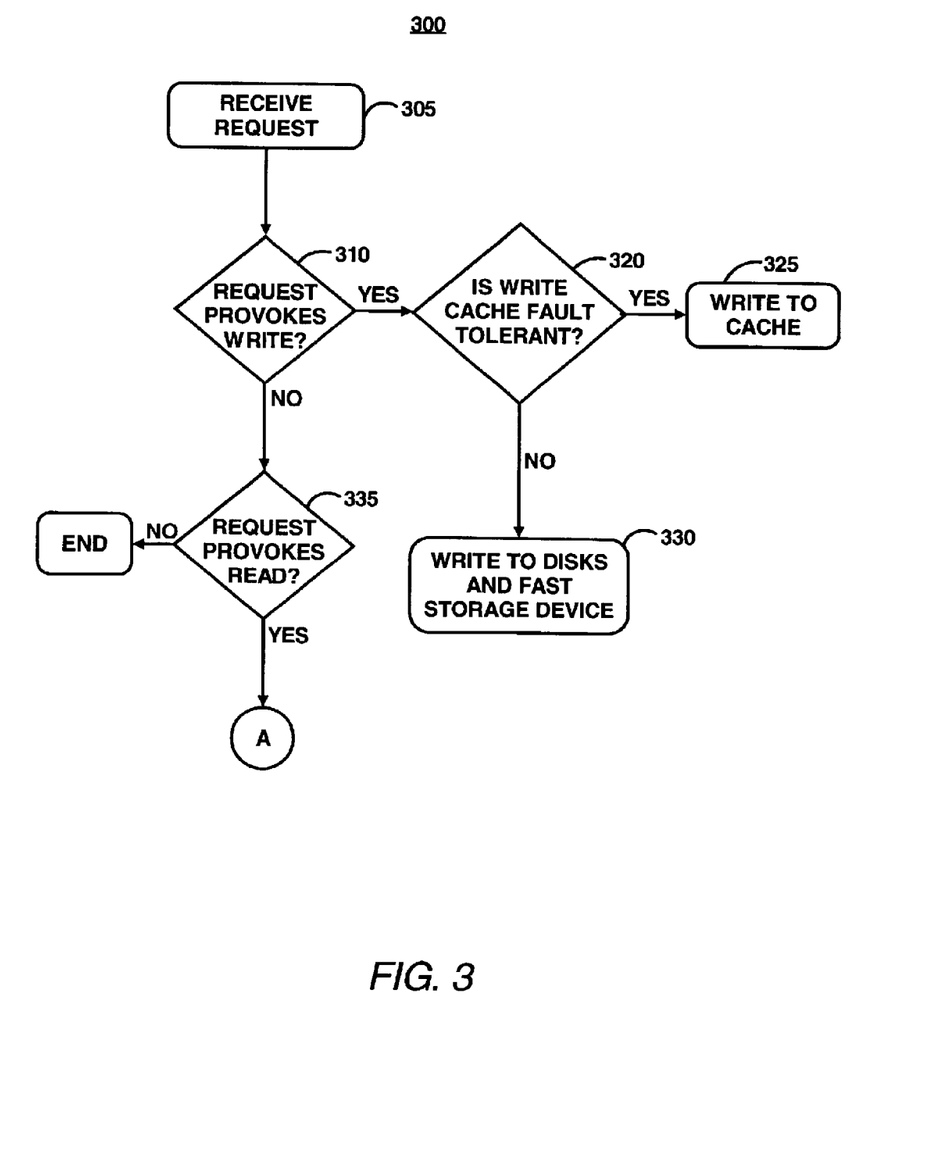
FIGS. 3 and 4 illustrate flow diagrams of an exemplary method for performing I/O operations on the computer system shown in FIG. 1, according to an embodiment of the invention.

FIG. 3 illustrates a flow diagram of a method 300 for performing I/O operations on the storage device 110, according to an embodiment of the invention. The method 300 is described with respect to the computer system 100 shown in FIG. 1, but may be applied to other systems. In step 305, the controller 160 receives a request to perform a data operation. The request may be transmitted by one of the clients 120.

In step 310, the controller 160 determines whether the request provokes a write operation on the storage device 110. Write operations may be provoked by write requests from a client 120 and requests from the controller 160. If the request provokes a write operation, a determination is made as to whether a fault-tolerant cache is used in the storage device 110 (step 320). If a fault-tolerant cache is used, data is written to the cache (step 325). The data may eventually be written to the disks 140 and the fast storage devices 150, for example, to avoid the data from being overwritten in the cache. In step 330, the controller 160 writes the data to the disk(s) 140 and writes a copy of the data to the fast storage devices 150, for example, substantially simultaneously if the cache is not fault-tolerant. Such as described with respect to FIGS. 2A–B, in one embodiment the disks 140 are striped and the fast storage devices 150 are also striped using smaller stripe units. Spare spaces are allocated in both the disks 140 and the fast storage devices 150, which may be used for reconstructing a failed device.

In step 335, if a write operation is not provoked, the controller 160 determines whether a read operation is provoked. Read operations may be provoked by read requests, read-ahead requests, etc. Read operations may be provoked by requests from a client 120 and/or the controller 160. In step 335, if a read operation is provoked, the steps shown in FIG. 4 are performed.

Figure 4:
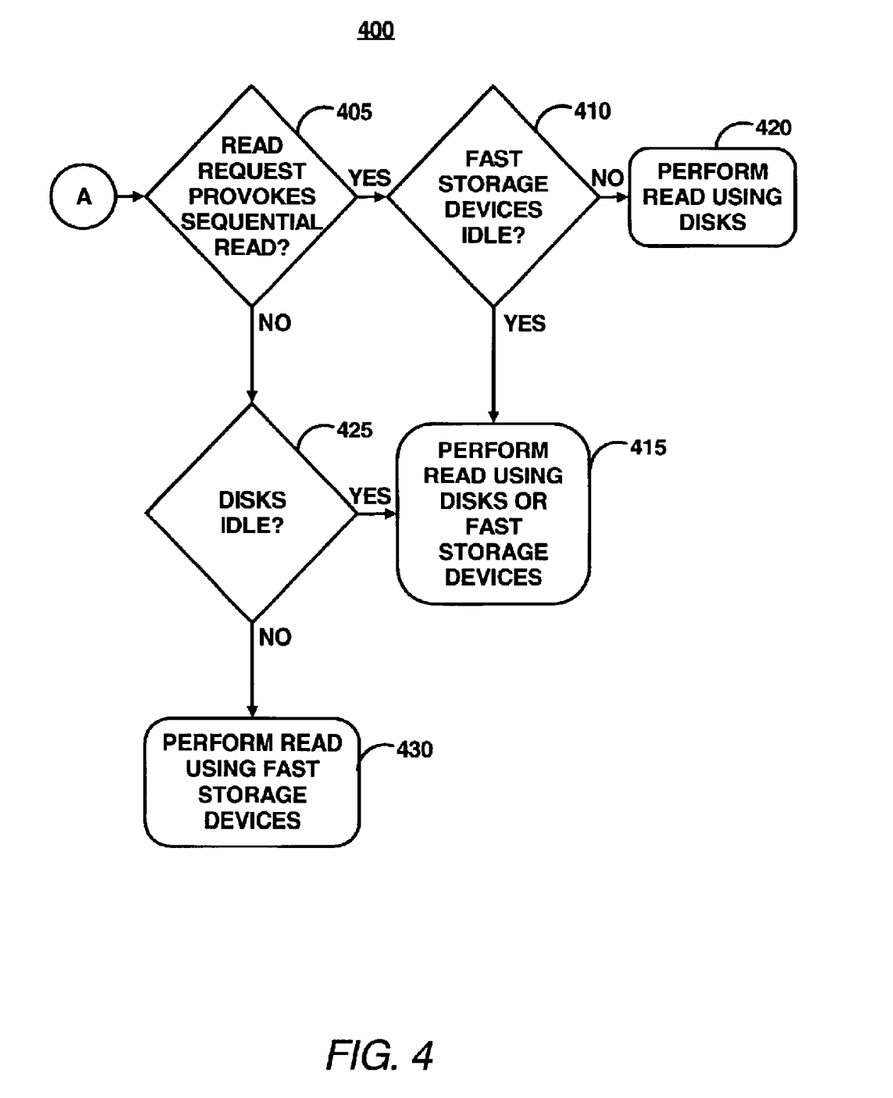

FIG. 4 illustrates a flow diagram of a method 400 for performing a read operation, according to an embodiment of the invention. For read requests, the controller 160 identifies "sequential" and "non-sequential" requests. As described above, a heuristic approach implemented by the controller 160 may be used to identify the type of request. The fast storage devices 150 may handle the non-sequential requests, because they have significantly faster positioning times. The disks 140 may handle the sequential requests, because they can efficiently handle sequential requests, and this leaves the fast storage devices 150 free to handle the non-sequential requests.

In step 405, the controller 160 determines whether the read request provokes a sequential read. If a sequential read is provoked, the controller 160 determines whether the fast storage devices 150 are idle (step 410). For example, the controller 160 may check a queue to determine whether any non-sequential reads, which are generally performed by the fast storage device 150, are pending. If the fast storage devices 150 are idle, the read may be performed by either the fast storage devices 150 or the disks 140 (step 415). If the fast storage devices are not idle, the read may be performed by the disks 140 (step 420).

If the read request does not provoke a sequential read (i.e., the read is non-sequential), then the controller 160 determines whether the disks 140 are idle (step 425). If the disks 140 are idle, the read may be performed by either the fast storage devices 150 or the disks 140 (step 415). If the disks 140 are not idle, the read may be performed by the fast storage devices 150 (step 430).

Figure 5:
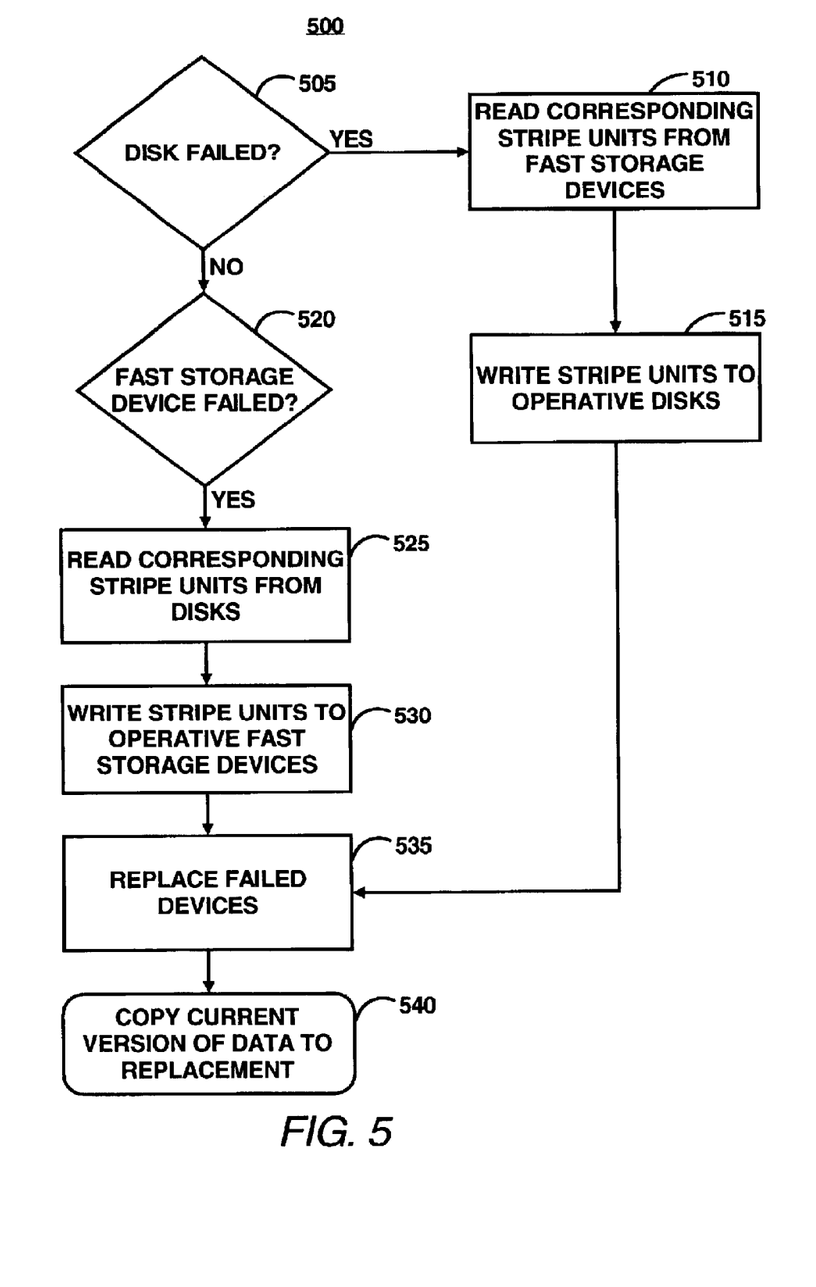
FIG. 5 illustrates a flow diagram of an exemplary method for reconstructing a failed disk or fast storage device, according to yet another embodiment of the invention.

FIG. 5 illustrates a flow diagram of a method 500 for reconstructing a failed disk or fast storage device, according to an embodiment of the invention. In step 505, the controller 160 determines whether a disk of the disks 140 failed. Disk failure may be detected using conventional techniques. If a disk is failed, the controller 160 reads corresponding stripe units from the fast storage device(s) 150 into a memory buffer (step 510). Then, the controller 160 writes the stripe units to the spare units in the operative disks (step 515). As described above, each disk stripe unit may be distributed over m–1 fast storage devices 150.

In step 520, the controller 160 determines whether a fast storage device of the fast storage devices 150 failed. Failure of a fast storage device may be detected using conventional techniques. If a fast storage device is failed, the controller 160 reads corresponding stripe units from the disk(s) 140 into a memory buffer (step 525). Then, the controller 160 writes the stripe units to the spare stripe units in the operative fast storage devices (step 530). The read load may be spread over multiple disks 140 (because of the rotation of stripe units) and the write load may be spread over multiple operative fast storage devices 150.

In step 535, the failed device is replaced. In step 540, the current version of the data is copied back to the replacement device. Every time a stripe unit is copied from a spare stripe unit back to the replacement device, the spare stripe unit may go back to being spare. A (potentially fault-tolerant) bitmap or watermark pointers can be used to keep track of the progress of the reconstruction.

The steps of the method 500 may be performed in the background, giving priority to external I/O requests. Since the data read first goes to a memory buffer, the reading and writing can proceed asynchronously. For example, the reading can proceed when the device to be written to is busy if there is space in the buffer. Similarly, writing can proceed as long as there is data for that device in the buffer.

The methods 300–500 are exemplary embodiments, and it will be apparent to one of ordinary skill in the art that these methods are subject to many alternatives, modifications and variations without departing from the spirit and scope of the invention. For example, some of the steps in the methods 300–500 may be performed in different orders or simultaneously. For example, in the methods 300 and 400, the controller may simultaneously perform or perform in a different order step(s) for determining whether a read or a write is provoked. These and other variations will be apparent to one of ordinary skill in the art.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of performing data operations in a storage system using fast storage devices, the method comprising steps of:

receiving a request to perform a data operation in a storage system comprising a first storage device sub-array and a fast storage device sub-array, substantially all of the data stored in the first storage device sub-array being replicated in the fast storage device sub-array;

determining whether the request provokes a write operation on the storage system; and in response to the request provoking a write operation, writing data to the first storage device sub-array using stripe units and writing redundant data to the fast storage device sub-array using stripe units smaller than the stripe units for the first storage device sub-array.

2. The method of claim 1, further comprising steps of:

determining whether the request provokes a read operation on the data storage device; and determining whether the read operation is one of sequential and non-sequential in response to the request provoking a read operation.

3. The method of claim 2, further comprising steps of:

reading data from the first storage device sub-array in response to the read operation being sequential; and reading data from the fast storage device sub-array in response to the read operation being non-sequential.

4. The method of claim 2, further comprising steps of:

determining whether the fast storage device sub-array is idle in response to the read operation being sequential;

reading data from one of the first storage device sub-array and the fast storage device sub-array in response to the fast storage device sub-array being idle; and reading data from the first storage device in response to the fast storage device sub-array not being idle.

5. The method of claim 2, further comprising steps of:

determining whether the first storage device sub-array is idle in response to the read operation being non-sequential;

reading data from one of the first storage device sub-array and the fast storage device sub-array in response to the first storage device sub-array being idle; and reading data the fast storage device sub-array in response to the first storage device sub-array not being idle.

6. The method of claim 1, wherein the step of writing data further comprises:

in response to the request provoking a write operation, determining whether the data is written to a fault tolerant cache; and in response to the cache not being fault tolerant, performing the step of writing data to the first storage device sub-array and the fast storage device sub-array.

7. A computer storage system comprising:

a controller configured to perform data operations; and a storage device array including a first sub-array having plurality of first storage devices storing data and a fast storage device sub-array including a plurality of fast storage devices storing data redundant to the data stored in the first sub-array, the first sub-array and the fast storage device sub-array having striped data, the fast storage device sub-array having stripe units smaller than stripe units in the first sub-array, and an amount of data in a stripe in the fast storage device sub-array being approximately equal to a size of a stripe unit in the first sub-array.

8. The computer storage system of claim 7, wherein a plurality of the smaller stripe units in the fast storage device sub-array store at least one of a copy of data stored in a stripe unit in the first sub-array.

9. The computer storage system of claim 8, wherein the plurality of smaller stripe units are distributed across a plurality of fast storage devices in the fast storage device sub-array.

10. The computer storage system of claim 7, wherein the faster storage device sub-array and the first sub-array in clued unused strip units for storing data associated with a failed device.

11. The computer storage system of claim 10, wherein the unused stripe units for each of the fast storage device sub-array and the first storage device sub-array are arranged similarly to parity blocks in a RAID 5 layout.

12. The computer storage system of claim 7, wherein the controller is configured to perform sequential reads on the first sub-array and non-sequential reads on the fast storage device sub-array.

13. The computer storage system of claim 7, wherein the controller is configured to write data to the first sub-array and write the redundant data to the fast storage device sub-array.

14. The computer storage system of claim 13, wherein the redundant data comprises at least a copy of the data stored in the first sub-array.

15. The computer storage system of claim 7, wherein the first sub-array includes a RAID.

16. The computer storage system of claim 7, wherein the fast storage device sub-array comprises one or more of MEMS, flash RAM, magneto-resistive RAM, DRAM, and SRAM.

17. A computer storage apparatus comprising:
a first storage device sub-array and a fast storage device sub-array, substantially all of the data stored in the first storage device sub-array being replicated in the fast storage device sub-array;
means for receiving a request to perform a data operation;
means for determining whether the request provokes a write operation on the storage apparatus; and
means for writing data to the first storage device sub-array using stripe units and writing redundant data to the fast storage device sub-array using stripe units smaller than the stripe units for the first storage device sub-array in response to the request provoking a write operation.

18. The apparatus of claim 17, further comprising:
means for determining whether the request provokes a read operation on the data storage apparatus; and
means for determining whether the read operation is one of sequential and non-sequential in response to the request provoking a read operation.

19. The apparatus of claim 18, further comprising:
means for reading data from the first storage device sub-array in response to the read operation being sequential; and
means for reading data from the fast storage device sub-array in response to the read operation being non-sequential.

20. A method of performing data operations in a storage system, the method comprising steps of:
receiving a request to perform a read operation in a storage system comprising first storage devices storing data using stripe units and fast storage devices storing data redundant of the data stored in the first storage devices using stripe units smaller than the stripe units for the first storage devices;
determining whether the read operation is one of sequential and non-sequential in response to the request provoking a read operation;
reading data from at least one of the first storage devices in response to the read operation being sequential; and
reading data from at least one of the fast storage devices in response to the read operation being non-sequential.

21. A computer storage apparatus comprising:
first storage devices storing data using stripe units and fast storage devices storing data redundant of the data stored in the first storage devices using stripe units smaller than the stripe units for the first storage devices;
means for receiving a request to perform a read operation;
means for determining whether the read operation is one of sequential and non-sequential in response to the request provoking a read operation;
means for reading data from at least one of the first storage devices in response to the read operation being sequential; and
means for reading data from at least one of the fast storage devices in response to the read operation being non-sequential.

22. A method of performing data operations in a storage system, the method comprising steps of:
receiving a request to perform a read operation in a storage system comprising first storage devices storing data using stripe units and fast storage devices storing data redundant of the data stored in the first storage devices using stripe units smaller than the stripe units for the first storage devices;
determining whether the read operation is one of sequential and non-sequential in response to the request provoking a read operation;
determining whether the fast storage devices are idle in response to the read operation being sequential;
reading data from the first storage devices or the fast storage devices in response to the fast storage devices being idle; and
reading data from the first storage devices in response to the fast storage devices not being idle.

23. A computer storage apparatus comprising:
first storage devices storing data using stripe units and fast storage devices storing data redundant of the data stored in the first storage devices using stripe units smaller than the stripe units for the first storage devices;
means for receiving a request to perform a read operation;
means for determining whether the read operation is one of sequential and non-sequential in response to the request provoking a read operation;
means for determining whether the fast storage devices are idle in response to the read operation being sequential;
means for reading data from the first storage devices or the fast storage devices in response to the fast storage devices being idle; and
means for reading data from the first storage devices in response to the fast storage devices not being idle.

24. A method of performing data operations in a storage system, the method comprising steps of:
receiving a request to perform a read operation in a storage system comprising first storage devices storing data using stripe units and fast storage devices storing data redundant of the data stored in the first storage devices using stripe units smaller than the stripe units for the first storage devices;
determining whether the read operation is one of sequential and non-sequential in response to the request provoking a read operation;

determining whether the first storage devices are idle in response to the read operation being non-sequential;

reading data from the first storage devices or the fast storage devices in response to the first storage devices being idle; and reading data the fast storage devices in response to the first storage devices not being idle.

25. A computer storage apparatus comprising:

first storage devices storing data using stripe units and fast storage devices storing data redundant of the data stored in the first storage devices using stripe units smaller than the stripe units for the first storage devices;

means for receiving a request to perform a read operation;

means for determining whether the read operation is one of sequential and non-sequential in response to the request provoking a read operation;

means for determining whether the first storage devices are idle in response to the read operation being non-sequential;

means for reading data from the first storage devices or the fast storage devices in response to the first storage devices being idle; and means for reading data the fast storage devices in response to the first storage devices not being idle.

26. A computer storage system comprising:

a storage device array including a first sub-array having plurality of first storage devices storing data and a fast storage device sub-array including a plurality of fast storage devices storing data redundant to the data stored in the first sub-array; and a controller configured to perform data operations, the controller being configured to perform sequential reads on the first sub-array and non-sequential reads on the fast storage device sub-array.

27. A computer storage system comprising:

a controller configured to receive requests for data operations on the storage system;

a storage device array including a first sub-array having plurality of first storage devices storing data using stripe units and a fast storage device sub-array including a plurality of fast storage devices storing data redundant to the data stored in the first sub-array using stripe units smaller than the stripe units for the first storage devices; and a cache memory for temporarily storing data written to the storage system wherein the cache memory stores the data redundantly and the data is eventually written to the storage device array.

28. A computer storage system comprising:

a controller configured to receive requests for data operations on the storage system;

a storage device array including a first sub-array having plurality of first storage devices storing data using stripe units and a fast storage device sub-array including a plurality of fast storage devices storing data redundant to the data stored in the first sub-array using stripe units smaller than the stripe units for the first storage devices; and a cache memory for temporarily storing data written to the storage system wherein the cache memory does not store the data redundantly and the data is substantially simultaneously written to the cache memory and to the storage device array.

* * * * *